(12) United States Patent
Damus (10) Patent No.: US 10,906,410 B2
(45) Date of Patent: Feb. 2, 2021

(54) SYSTEM AND METHODS FOR REDUCING PARASITIC POWER LOSSES BY AN ENERGY SOURCE

(71) Applicant: Hadal, Inc., Oakland, CA (US)

(72) Inventor: Robert S. Damus, Alameda, CA (US)

(73) Assignee: HADAL, INC., Oakland, CA (US)

( * ) Notice: Subject to any disclaimer, the term of this patent is extended or adjusted under 35 U.S.C. 154(b) by 44 days.

(21) Appl. No.: 16/009,100

(22) Filed: Jun. 14, 2018

(65) Prior Publication Data

US 2018/0361873 A1 Dec. 20, 2018

Related U.S. Application Data

(60) Provisional application No. 62/519,282, filed on Jun. 14, 2017.

(51) Int. Cl.
| | |
|---|---|
| *B63G 8/08* | (2006.01) |
| *B60L 50/60* | (2019.01) |
| *B60L 11/18* | (2006.01) |
| *B63G 8/00* | (2006.01) |
| *B60L 53/00* | (2019.01) |

(52) U.S. Cl.
CPC .......... *B60L 50/66* (2019.02); *B60L 11/1877* (2013.01); *B63G 8/001* (2013.01); *B63G 8/08* (2013.01); *B60L 53/00* (2019.02); *B60L 2200/32* (2013.01); *B63G 2008/004* (2013.01)

(58) Field of Classification Search
CPC ...... B60L 11/1877; B60L 53/00; B60L 50/66; B60L 2200/32; B63G 8/08; B63G 8/001; B63G 2008/004
See application file for complete search history.

(56) References Cited

U.S. PATENT DOCUMENTS

| | | | |
|---|---|---|---|
| 5,874,786 A * | 2/1999 | McVey | H02J 1/10 244/172.7 |
| 6,140,800 A | 10/2000 | Peterson | |
| 6,430,692 B1 * | 8/2002 | Kimble | G06F 1/263 307/66 |
| 6,545,449 B2 | 4/2003 | Ueda et al. | |
| RE39,749 E * | 7/2007 | Ikawa | 320/132 |
| 8,058,743 B2 * | 11/2011 | Chen | B60L 1/00 307/10.1 |
| 8,319,375 B2 * | 11/2012 | Taniuchi | H02J 1/102 307/29 |
| 9,197,143 B1 * | 11/2015 | Townsend | H02J 1/108 |
| 2002/0117896 A1 * | 8/2002 | Gohara | B60L 1/003 307/10.1 |
| 2005/0029867 A1 * | 2/2005 | Wood | H02J 1/14 307/10.1 |

(Continued)

*Primary Examiner* — Rexford N Barnie
*Assistant Examiner* — Terrence R Willoughby
(74) *Attorney, Agent, or Firm* — Burns & Levinson, LLP; Christopher Carroll (57) ABSTRACT

Systems and methods are described herein for a dual-voltage power system. In some aspects, a dual-voltage power system can include a first battery module and a second battery module. In some aspects, the first battery module operates at a first voltage and the second battery module operates at a second voltage. In some aspects, the first battery module delivers power to a plurality of primary systems. In some aspects, the second battery module delivers power to a plurality of parasitic systems.

13 Claims, 11 Drawing Sheets

(56) References Cited

U.S. PATENT DOCUMENTS

| | | | |
|---|---|---|---|
| 2005/0035656 A1* | 2/2005 | Kuramochi | H02J 1/08 307/10.1 |
| 2005/0285445 A1* | 12/2005 | Wruck | H02J 1/14 307/10.1 |
| 2009/0261796 A1* | 10/2009 | Ito | B60R 16/03 323/285 |
| 2009/0302681 A1* | 12/2009 | Yamada | H02J 7/35 307/46 |
| 2010/0052622 A1* | 3/2010 | Chen | H02J 7/0013 320/148 |
| 2010/0121511 A1* | 5/2010 | Onnerud | H02J 7/0014 701/22 |
| 2011/0012427 A1* | 1/2011 | Craig | H02J 3/14 307/29 |
| 2012/0056478 A1* | 3/2012 | Omoto | B60L 58/12 307/11 |
| 2012/0074894 A1* | 3/2012 | Chen | H01M 16/00 320/103 |
| 2012/0176098 A1* | 7/2012 | Greening | G06F 1/189 320/136 |
| 2012/0281503 A1 | 11/2012 | Rikoski | |
| 2013/0069428 A1* | 3/2013 | Lee | H02J 9/06 307/18 |
| 2013/0082639 A1* | 4/2013 | O'Kane | B60R 16/033 320/104 |
| 2013/0093396 A1* | 4/2013 | Dien | H02J 7/0013 320/118 |
| 2013/0154356 A1* | 6/2013 | Nakajima | B60R 16/033 307/9.1 |
| 2013/0221925 A1* | 8/2013 | Nishida | H02J 7/0063 320/118 |
| 2014/0035360 A1 | 2/2014 | Butzmann et al. | |
| 2014/0184140 A1* | 7/2014 | Lee | H02M 3/1582 320/103 |
| 2015/0149014 A1* | 5/2015 | Kees | H02J 7/342 701/22 |
| 2016/0039300 A1* | 2/2016 | Wang | B60L 11/1822 244/39 |
| 2016/0318411 A1* | 11/2016 | Goetz | H02J 1/00 |
| 2018/0215371 A1* | 8/2018 | Tajima | B60L 53/22 |

* cited by examiner

FIG. 10B

SYSTEM AND METHODS FOR REDUCING PARASITIC POWER LOSSES BY AN ENERGY SOURCE

REFERENCE TO RELATED APPLICATIONS

This application claims priority to and the benefit of U.S. Provisional Patent Application No. 62/519,282, filed on Jun. 14, 2017, and entitled "System and Methods for Reducing Parasitic Power Losses By an Energy Source." The entire contents of the above-referenced application are incorporated herein by reference.

BACKGROUND

The past several decades have seen a steady increase in the number of unmanned underwater robotic systems deployed for use in the ocean. These systems are also referred to as autonomous underwater vehicles (AUVs). All of these systems are equipped with energy sources or systems including batteries to accomplish their respective mission. Typical battery power systems use a down converter circuit to provide power to parasitic systems that supplement the battery in some manner, resulting in unacceptable power discharge and shortened battery life. Because all batteries have some internal resistance, any amount of current drawn from a battery results in some amount of energy loss based on $I^2R$ power losses. Also, a typical voltage down converter includes a resistance element to create a voltage drop that reduces the output voltage from a power source. Again, such a voltage drop across the down converting resister results in further IV power losses. Parasitic losses may be incurred by hotel loads (other low voltage circuits and systems) and circuit components (e.g., diodes). Even a relatively small amount of parasitic current form a high voltage power source can result in a substantial amount of $I^2R$ power losses over a relatively short period of time which, in turn, results in a substantially reduced operational time for an unmanned underwater vehicle over the course of a mission. Hence, there is a need to reduce power losses associated with down converting and powering lower voltage parasitic systems within underwater vehicles to extend the operational up time of underwater vehicles before battery recharge is required.

SUMMARY

Systems and methods described herein address the need for reducing parasitic power losses by, for example, implementing a separate lower voltage battery to supply power to parasitic systems such that the amount of power loss that would otherwise result from using a primary battery system with a voltage down converter is substantially reduced, enabling improved battery longevity and AUV performance. Systems and methods are described herein for a dual-voltage or multi-voltage power system. In some aspects, a power system can include a first battery module and a second battery module. In some aspects, the first battery module operates at a first voltage and the second battery module operates at a second voltage. In some aspects, the first battery module delivers power to a plurality of primary systems. In some aspects, the second battery module delivers power to a plurality of parasitic systems.

In one implementation, a power system for an autonomous vehicle includes a first battery module and a second battery module. In some aspects, the first battery module operates at a first voltage and the second battery module operates at a second voltage. In some aspects, the first battery module delivers power to a plurality of primary systems. In some aspects, the second battery module delivers power to a plurality of parasitic systems.

Parasitic systems may include, for example, one or more processors and/or controllers, one or more sensors, one or more switches, one or more low voltage servos or motors, one or more monitoring or scientific instruments (e.g., camera systems, lighting systems, etc . . . ), one or more communications circuits, and one or more electronic systems using a voltage that is lower than a primary output voltage from a battery system. The one or more processors and/or controllers may include circuitry and/or software to control one or functions of an unmanned underwater vehicle. In some aspects, the first or primary voltage is nominally 300 V. The first voltage may be any relatively higher voltage in relation to a secondary or parasitic voltage. The nominal primary voltage may be a factor higher than the secondary voltage. The factor may be 2, 3, 4, 5, 10, 20, 50, 100, and so on. The primary voltage may greater than or equal to about 50 V, 75 V, 100 V, 200 V, 300 V, 400 V, 500 V, 600 V, and 1000V. In some aspects, the second or nominal secondary voltage is 30 V. The nominal secondary voltage may less than or equal to about 1 V, 2 V, 3 V, 4 V, 5 V, 10 V, 20 V, 30 V, 50 V, and 100 V.

By utilizing a second battery module having a second voltage that is lower than the first voltage, the need for using a voltage down converter to reduce the first voltage to the second voltage is eliminated. Hence, the $I^2R$ power losses caused by parasitic current drawn from the first battery module through the down converter are eliminated, reducing the parasitic losses of the power system. While the second battery module has its own internal resistance, the $I^2R$ power losses incurred drawing parasitic current from the second battery module is substantially lower than the $I^2R$ power losses that would otherwise have been incurred by the first battery module using a down converter. Hence, the configuration utilizing a second battery module to provide power to parasitic components and/or circuits advantageously preserves more power for both the first battery module and second battery modules and, thereby, advantageously extends to operational time of the unmanned underwater vehicle before re-charge of the battery modules is needed.

In some aspects, the first battery module comprises a first plurality of battery cells. In some aspects, the second battery module comprises a second plurality of battery cells. In one configuration, the first plurality of battery cells are arranged in series to provide a first or primary voltage. At least one battery cell may be configured to provide a secondary voltage that is lower than the primary voltage. The secondary voltage may be provided to some or all parasitic systems or components. In one implementation, the first battery module includes at least two battery cells arranged to provide the secondary voltage. In this way, if the secondary voltage output from a first battery cell to parasitic systems falls below a threshold voltage, the voltage output can be switched to a second battery cell to provide the secondary voltage to the parasitic systems. In one implementation, the second battery module includes at least one battery cell of the first battery module.

In another aspect, a method for providing power to an autonomous vehicle comprises operating a first battery module at a first voltage, delivering first power to a first one or more primary systems from the first battery module, operating a second battery module at a second voltage, wherein the second voltage is lower than the first voltage, and delivering second power to a second one or more primary systems from the second battery module.

Other objects, features, and advantages of the present invention will become apparent upon examining the following detailed description, taken in conjunction with the attached drawings.

BRIEF DESCRIPTION OF THE DRAWINGS

The systems and methods described herein are set forth in the appended claims. However, for purpose of explanation, several illustrative aspects are set forth in the following figures.

DETAILED DESCRIPTION

Figure 1:
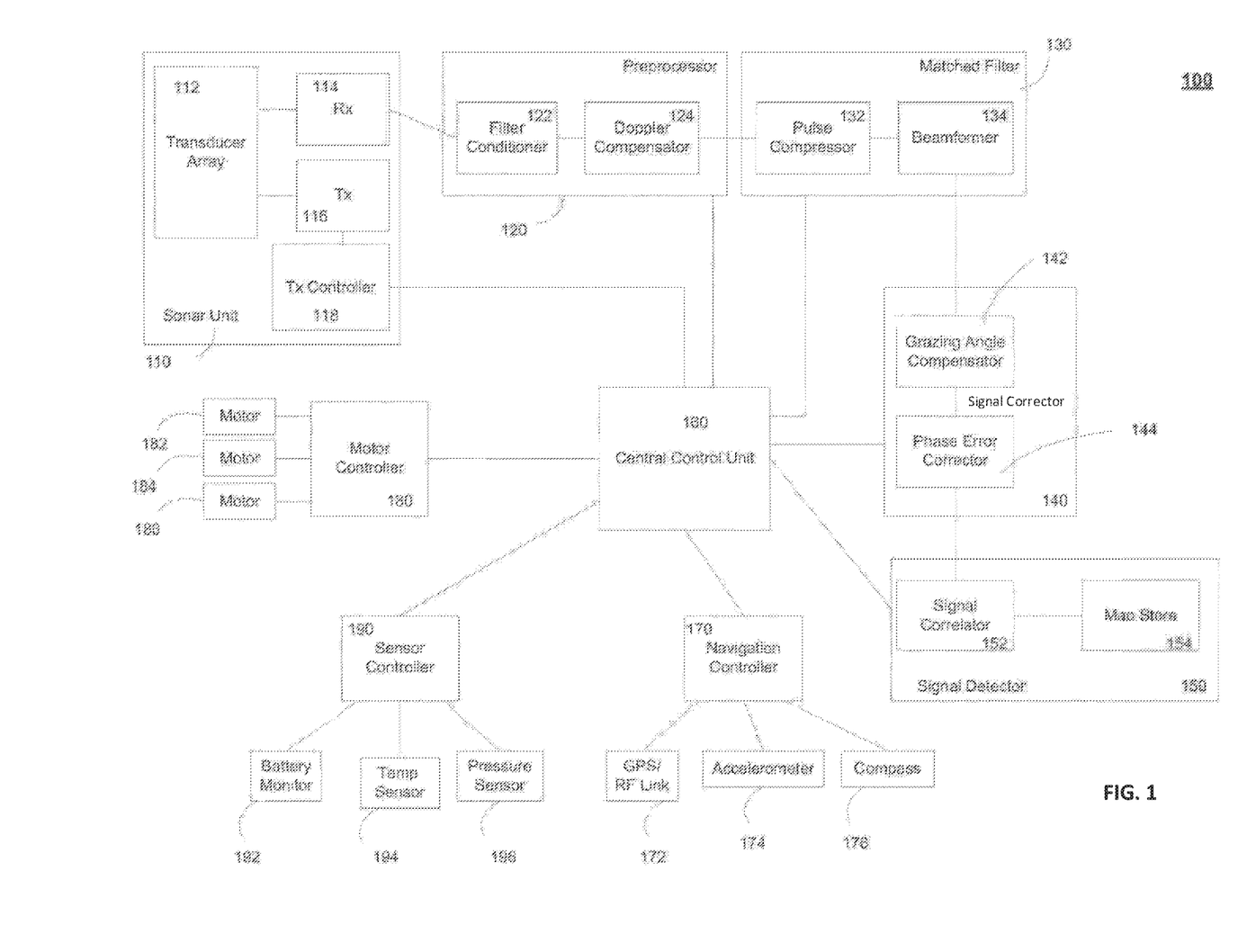
FIG. 1 is a block diagram of an exemplary remote vehicle system for implementing at least a portion of the systems and methods described in the present disclosure.

FIG. 1 is a block diagram depicting an illustrative remote vehicle, according to an illustrative aspect of the present disclosure. The system 100 includes a sonar unit 110 for sending and receiving sonar signals, a preprocessor 120 for conditioning a received (or reflected) signal, and a matched filter 130 for performing pulse compression and beamforming. The system 100 is configured to allow for navigating using high-frequency (greater than about 100 kHz) sonar signals. To allow for such HF navigation, the system 100 includes a signal corrector 140 for compensating for grazing angle error and for correcting phase error. The system 100 also includes a signal detector 150 for coherently correlating a received image with a map. In some aspects, the system 100 includes an on-board navigation controller 170, motor controller 180 and sensor controller 190. The navigation controller 170 may be configured to receive navigational parameters from a GPS/RF link 172 (when available), an accelerometer 174, a gyroscope, and a compass 176. The motor controller 180 may be configured to control a plurality of motors 182, 184 and 186 for steering the vehicle. The sensor controller 190 may receive measurements from the battery monitor 172, a temperature sensor 194 and a pressure sensor 196. The system 100 further includes a central control unit (CCU) 160 that may serve as a hub for determining navigational parameters based on sonar measurements and other navigational and sensor parameters, and for controlling the movement of the vehicle. In the context of a surface or underwater vehicle, the CCU 160 may determine navigational parameters such as position (latitude and longitude), velocity (in any direction), bearing, heading, acceleration and altitude. The CCU 160 may use these navigational parameters for controlling motion along the alongtrack direction (fore and aft), acrosstrack direction (port and starboard), and vertical direction (up and down). The CCU 160 may use these navigational parameters for controlling motion to yaw, pitch, roll or otherwise rotate the vehicle.

As noted above, the system 100 includes a sonar unit 110 for transmitting and receiving acoustic signals. The sonar unit includes a transducer array 112 having a one or more transmitting elements or projectors and a plurality of receiving elements arranged in a row. In certain aspects the transducer array 112 includes separate projectors and receivers. The transducer array 112 may be configured to operate in SAS mode (either stripmap or spotlight mode) or in a real aperture mode. In certain aspects, the transducer array 112 is configured to operate as a multibeam echo sounder, sidescan sonar or sectors can sonar. One example of an array 112 includes a 16 channel array with 5 cm elements mounted in a 12¾ inch vehicle.

The system 100 may include other components, not illustrated, without departing from the scope of the present disclosure. For example, the system 100 may include a data logging and storage engine. In certain aspects the data logging and storage engine may be used to store scientific data which may then be used in post-processing for assisting with navigation. The system 100 may include a security engine for controlling access to and for authorizing the use of one or more features of system 100. The security engine may be configured with suitable encryption protocols and/or security keys and/or dongles for controlling access. For example, the security engine may be used to protect one or more maps stored in the map store 154. Access to one or more maps in the map store 154 may be limited to certain individuals or entities having appropriate licenses, authorizations or clearances. Security engine may selectively allow these individuals or entities access to one or more maps once it has confirmed that these individuals or entities are authorized. The security engine may be configured to control access to other components of system 100 including, but not limited to, navigation controller 170, motor controller 180, sensor controller 190, transmitter controller 118, and CCU 160.

Optionally, the system may include an inertial navigation system, a Doppler sensor, an altimeter, a gimbling system to fixate the sensor on a populated portion of a holographic map, a global positioning system (GPS), a long baseline (LBL) navigation system, an ultrashort baseline (USBL) navigation, or any other suitable navigation system.

Figure 2:
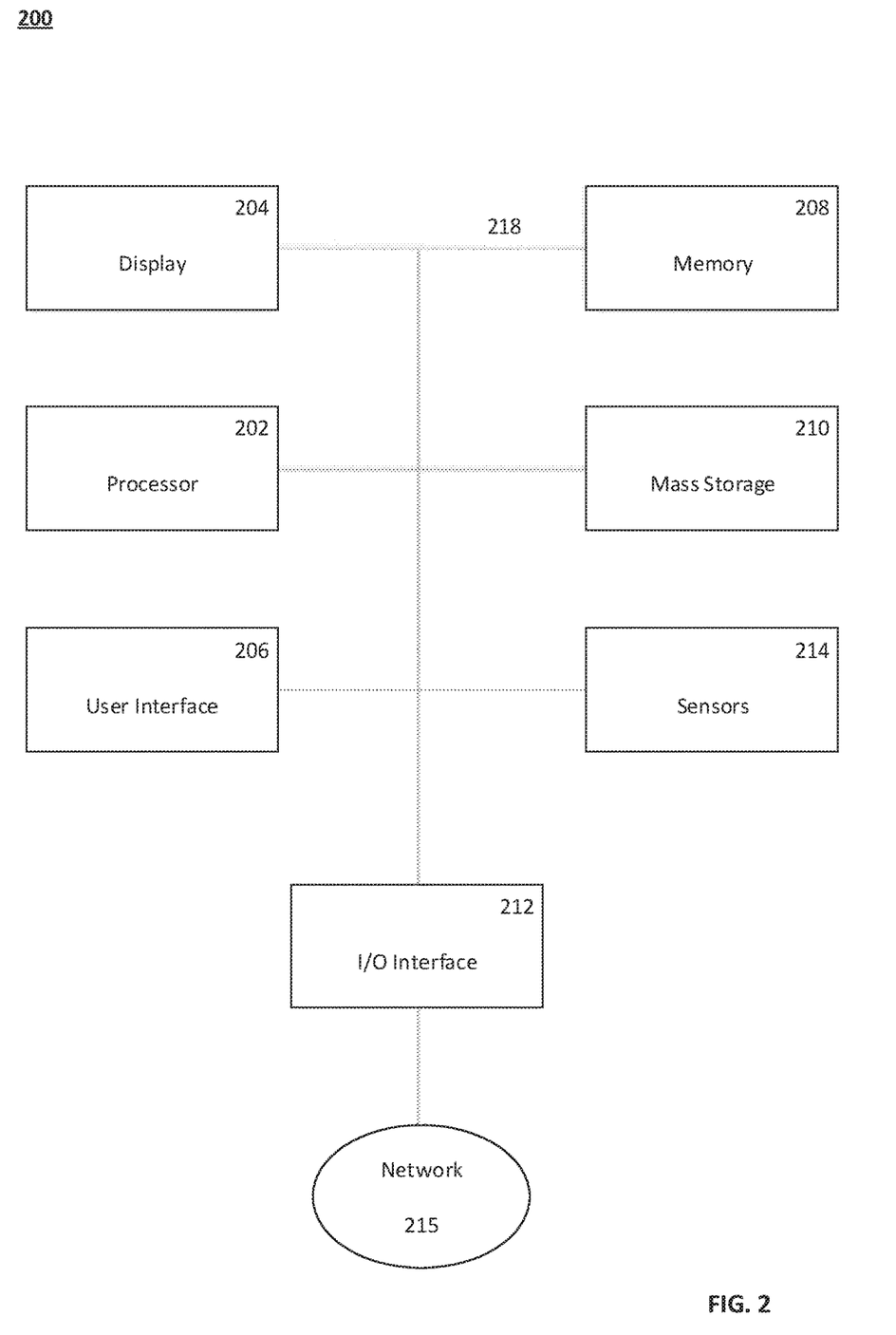
FIG. 2 is a block diagram of an exemplary computer system for implementing at least a portion of the systems and methods described in the present disclosure.
Figure 3:
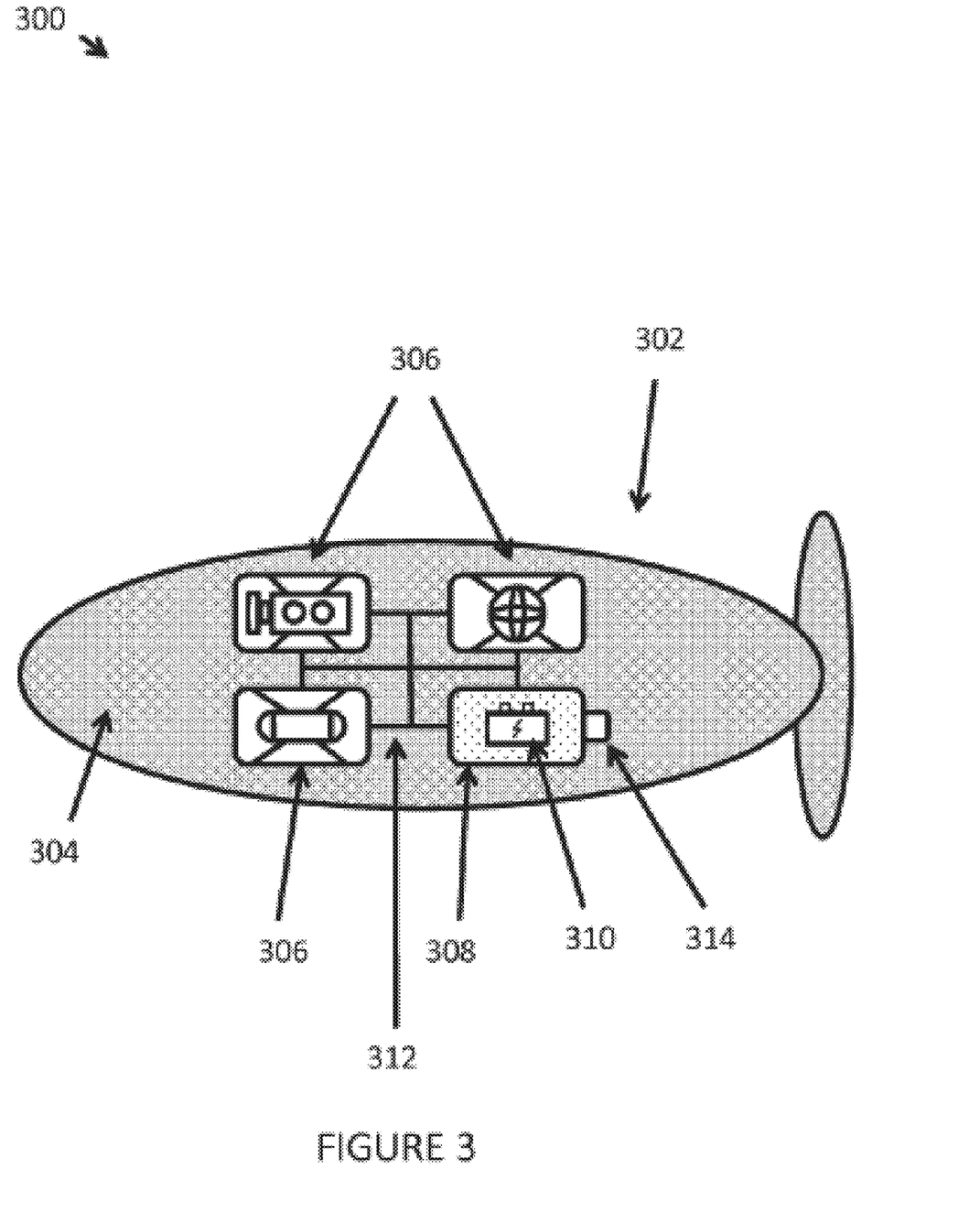
FIG. 3 is a block diagram depicting an exemplary remote vehicle, according to an illustrative aspect of the present disclosure.

FIG. 3 is a block diagram depicting an exemplary remote vehicle, according to an illustrative aspect of the present disclosure. Such an exemplary remote or autonomous vehicle includes a main body 302, along with a drive unit 304. For example, the drive unit 304 may be a propeller. The remote vehicle includes internal components, which may be located within different compartments within the main body 302. For example, the main body 302 may house a component 306. For example, the component 306 may be a sonar unit. Similarly, the main body 302 may house a pressure tolerant energy system 310, which may include a computer system, as described for example in FIG. 1 and FIG. 2. In addition, the remote or autonomous vehicle includes a power generating system 308. For example, the power generating system 308 may be a stack of battery elements, each comprising a stack of battery cells.

Large batteries use large arrays of cells. A series connection (with or without other parallel connections) may be required to meet specific power requirements. Any imbalance between cells may affect battery performance. If charging cells in series, charging is only desirable until one of the cells reaches its maximum cell voltage—proceeding with charging beyond that point would result in cell damage and/or may cause fire or explosion through the battery.

A vehicle, for example an underwater vehicle, may be powered by an array of battery packs, each battery pack comprising battery cells. These battery cells may comprise any suitable battery for providing energy to a vehicle, including, but not limited to, any suitable battery chemistry, a lithium battery, lithium-ion battery, lithium polymer battery, or a lithium sulfur battery. The battery cells may be in a matrix, or the battery cells may be arranged, aligned, or positioned in any suitable arrangement. In some aspects, the battery cells may be stacked on top of each other. In such aspects, the battery cells may include a separator between each vertically-stacked cell. The one or more battery cells may be positioned on a tray, wherein the tray provides structural support, alignment, and electrical insulation for the one or more battery cells. A backplane may connect the battery cells to management circuitry, described in further detail below. In alternate aspects, battery cells may be directly connected to the management circuitry. In some aspects, the battery cells may be connected to management circuitry through a communication network. A communication network may be any suitable network for communicating control signals. The management circuitry may comprise a pressure tolerant circuit board that may be manually programmed using any suitable programming language. In some aspects, a temperature sensor may be connected to the battery cells, either directly or through backplane. The battery cells may be configured to communicate cell health information, including at least a voltage and temperature, to the management circuitry. The management circuitry may include a water-intrusion detection circuit board, which may comprise a conductive trace that drops in resistance in the presence of water.

The primary factors that affect mission duration and sensor payload capability of an autonomous vehicle include the performance of the battery modules, including their ability to charge and discharge. Equally important for certain cell chemistries (e.g., Lithium Ion) is circuitry used in the management of the battery components. A battery manager (BMGR) may be configured to interface with the outside world and to protect the battery (by disconnecting the charge input and/or discharge output) if voltage or temperature safety limits are exceeded. The BMGR may shut down the battery immediately if it detects any individual cell voltage above the max cell voltage, or if any individual cell temperature exceeds a manufacturer recommended maximum temperature. The BMGR may disable charging of the battery system if any cell temperature is below a manufacturer recommended minimum temperature. The BMGR may disable discharging of the battery system if any cell temperature is below a manufacturer recommended minimum temperature for discharge, which may differ from the charge limit temperature. An over-discharge protection feature may be activated at any time, which will also shut down the battery if any individual cell voltage drops below a manufacturer recommended minimum cell voltage. To prevent an over-current condition, the battery system may be equipped with a pressure tolerant fuse in series with the positive terminal, and the BMGR may provide a controllable dual disconnect (high and low side switches). Further details regarding an exemplary pressure tolerant fuse are provided in U.S. Patent Application Publication No. 2012/0281503, the entire contents of which are incorporated herein by reference. This provides a safety feature by requiring two concurrent failures to happen before an uncommanded output voltage can be presented at the battery output.

Figure 4:
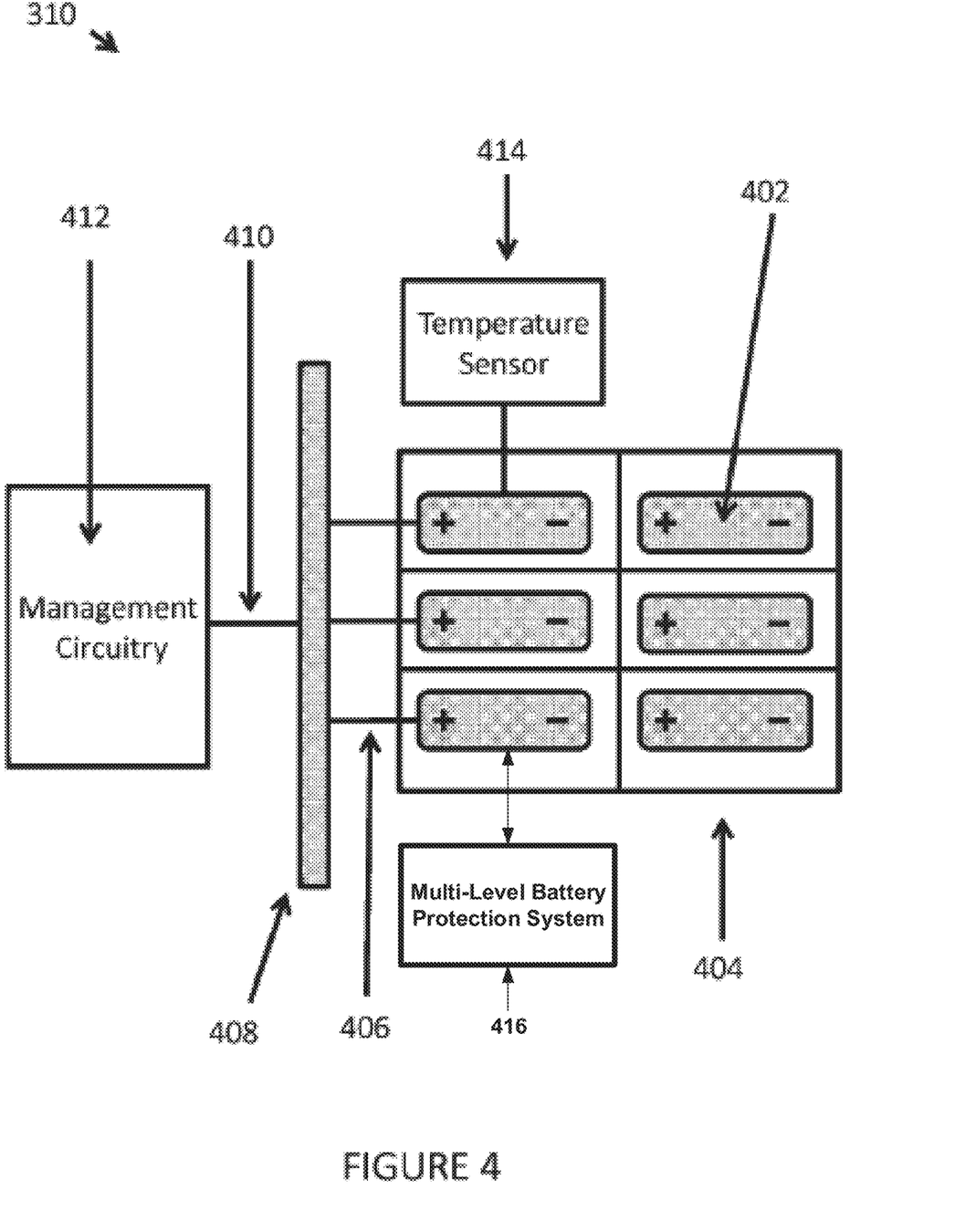
FIG. 4 is a block diagram depicting an illustrative example of a pressure tolerant energy system, according to an illustrative aspect of the present disclosure.

FIG. 4 is a block diagram depicting an illustrative example of a pressure tolerant energy system, such as the pressure tolerant energy system 310 depicted in FIG. 3. The pressure tolerant energy system 310 may comprise one or more battery cells 402, tray 404, electrical connections 406, backplane 408, communication network 410, management circuitry 412, a temperature sensor 414, and a multi-level battery protection system 416, and a suitable enclosure.

The battery cells 402 may comprise any suitable battery for providing energy to an underwater vehicle, including, but not limited to, a lithium battery, lithium-ion battery, lithium polymer battery, or a lithium sulfur battery. In some aspects, the battery cells 402 may be neutrally buoyant (e.g., compared to fresh water or sea/ocean water). Although the battery cells 402 are depicted in FIG. 4 in a 3×2 matrix, the battery cells 402 may be arranged, aligned, or positioned in any suitable arrangement. In some aspects, the battery cells 402 may be stacked on top of each other. In such aspects, the battery cells 402 may include a separator between each vertically-stacked cell.

The battery cells 402 may be placed into tray 404. The tray 404 may be made from any suitable material, such as thermoformed plastic. The tray 404 may provide structural support, alignment, and electrical insulation for the battery cells 402. The tray may be placed in an enclosure to support multiple trays stacked upon each other.

The battery cells 402 may be electrically and/or structurally connected to backplane 408. The backplane may provide both structural support and alignment for the battery cells 402. The backplane may also connect to an energy distribution system, such as energy distribution system 312 depicted in FIG. 3. In alternate aspects, the battery cells 402 may be connected directly to an energy distribution system.

The backplane may connect the battery cells 402 to the management circuitry 412. In alternate aspects, battery cells 402 may be directly connected to the management circuitry 412. In some aspects, the battery cells 402 may be connected to management circuitry 412 through communication network 410. Communication network 410 may be any suitable network for communicating control signals. The management circuitry 412 may comprise a pressure tolerant circuit board that may be manually programmed using any suitable programming language. In some aspects, a temperature sensor may be connected to the battery cells 402, either directly or through backplane 408. The battery cells 402 may be configured to communicate cell health information, including at least a voltage and temperature, to the management circuitry 412. The management circuitry 412 may include a water-intrusion detection circuit board, which may comprise a conductive trace that drops in resistance in the presence of water. The battery cells 402 may be connected to the multi-level battery protection system 416. The multi-level battery protection system may comprise fuses at the junction box and at each battery cell as well as a current limiting circuit (CLC) and a microprocessor circuit.

Figure 5:
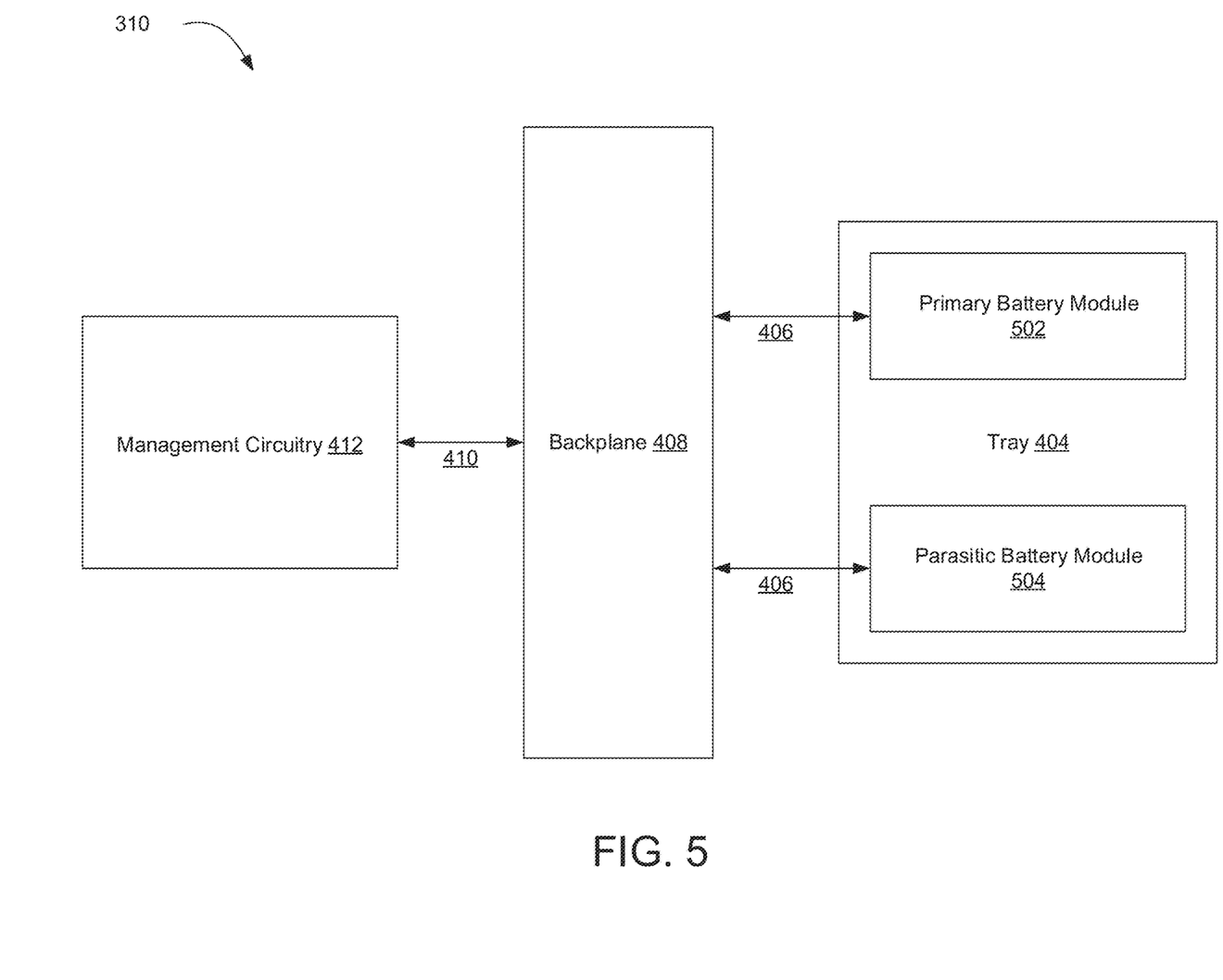
FIG. 5 is a block diagram depicting an illustrative example of a dual-voltage power system with a dual-voltage power system, according to an illustrative aspect of the present disclosure.

FIG. 5 is a block diagram depicting an illustrative example of a pressure tolerant energy system with a dual-voltage power system, such as the pressure tolerant energy system 310 depicted in FIG. 3. The pressure tolerant energy system 310 may include management circuitry 412, communication network 410, backplane 408, electrical connections 406, tray 404, primary battery module 502, and parasitic battery module 504. Other components illustrated by pressure tolerant energy system 310 in FIG. 4 have been omitted for ease of explanation.

The primary battery module 502 may operate at a voltage suitable for providing power to primary systems. The nominal operating voltage of the primary battery module 502 may be 300 V. The primary battery module 502 may comprise multiple battery cells 402 as shown in FIG. 4. The parasitic battery module 504 may operate at a voltage suitable for providing power to parasitic systems. The nominal operating voltage of the parasitic battery module 504 may be 30 V. The parasitic battery module 504 may comprise multiple battery cells 402 as shown in FIG. 4. In some aspects, the parasitic battery module 504 may comprise one battery cell 402.

The primary battery module 502 and parasitic battery module 504 may be placed into tray 404. The tray 404 may be made from any suitable material, such as thermoformed plastic. The tray 404 may provide structural support, alignment, and electrical insulation for the primary battery module 502 and parasitic battery module 504. In some aspects, the primary battery module 502 and parasitic battery module 504 may be placed into two separate trays in order to provide further electrical insulation due to the large difference in operating voltages between the primary battery module 502 and parasitic battery module 504. These separate trays may be stacked in either the same enclosure (as shown in FIG. 9), or in separate enclosures (as shown in FIGS. 7 and 8).

In one aspect, the primary battery module 502 and parasitic battery module 504 may be connected directly to an energy distribution system (an electrical "bus"), perhaps by a junction box. In another aspect, the primary battery module 502 and parasitic battery module 504 may be connected to two different energy distribution networks. Each energy distribution system may distribute power to the primary systems and parasitic systems, respectively, either from within their own enclosure or via connections between the enclosures (as shown in FIG. 10).

In one aspect, primary battery module 502 and parasitic battery module 504 may be directly connected to the management circuitry 412. In some aspects, the primary battery module 502 and parasitic battery module 504 may be connected to management circuitry 412 through communication network 410. Communication network 410 may be any suitable network for communicating control signals. The management circuitry 412 may comprise a pressure tolerant circuit board that may be manually programmed using any suitable programming language. In some aspects, the management circuitry 412 may manage the power delivered from the primary battery module 502 and the power delivered from the parasitic battery module 504. In some aspects, the management circuitry 412 may comprise two sub management circuitries in order to separately manage the power from the primary battery module 502 and the power delivered from the parasitic battery module 504.

Figure 6:
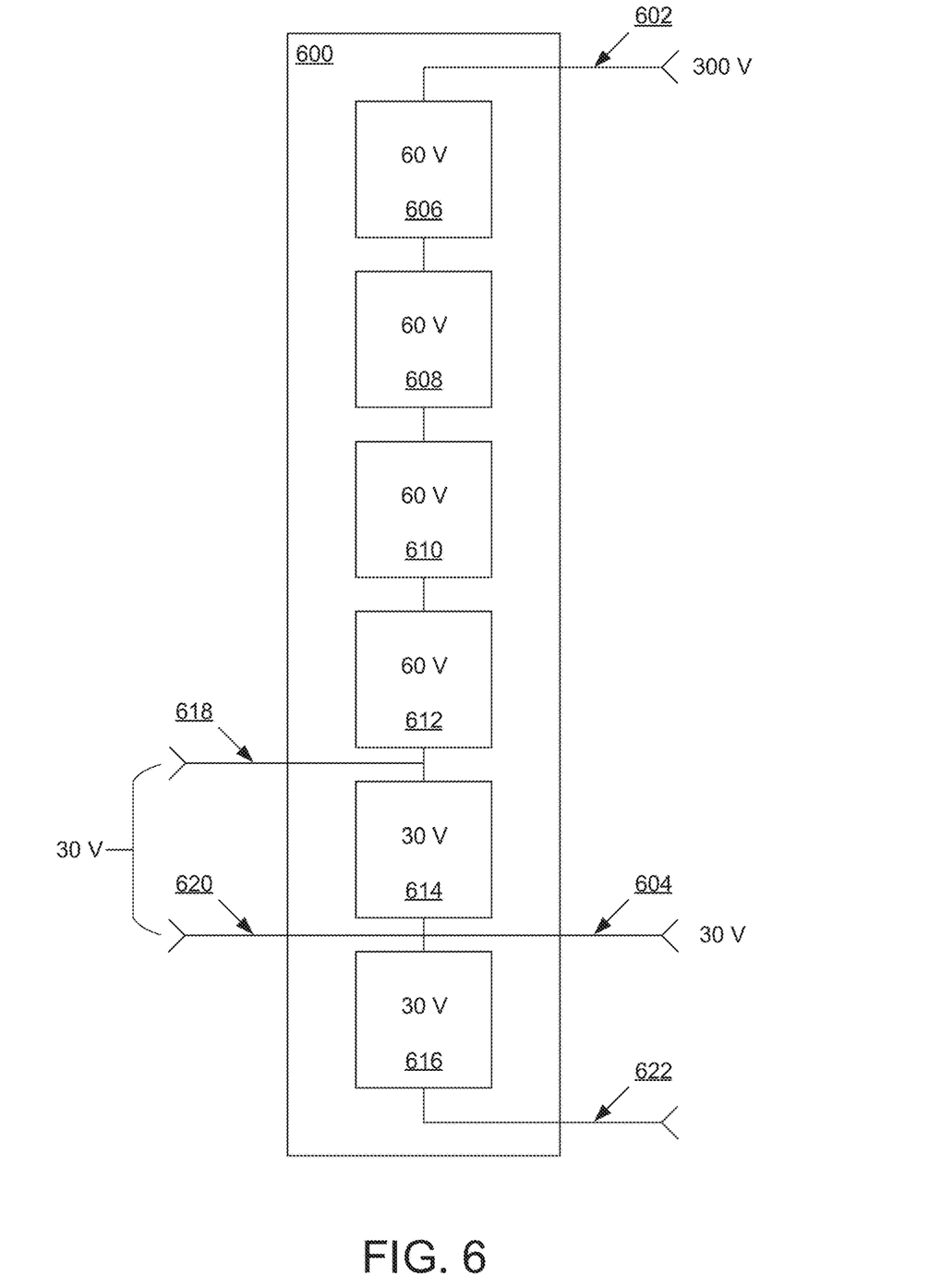
FIG. 6 is a block diagram of a battery module including multiple battery cells, according to an illustrative aspect of the present disclosure.

FIG. 6 is a block diagram of a battery module 600 including multiple battery cells 606, 608, 610, 612, 614, and 616 according to an illustrative aspect of the disclosure. In one configuration, the first plurality of battery cells 606-616 are arranged in series to provide a first or primary voltage output 602, e.g., 300V (between leads 602 and 622). At least one battery cell 616 may be configured to provide a secondary voltage output 604, e.g., 30 V (between leads 604 and 622), that is lower than the primary voltage output 602. The secondary voltage output 604 may be provided to some or all parasitic systems or components. In one implementation, the battery module 600 includes at least two battery cells 614 and 616 arranged to provide the secondary voltage. In this way, if the secondary voltage output from a first battery cell 616 to parasitic systems falls below a threshold voltage, the voltage supply can be switched to a second battery cell 614 to provide the secondary voltage (between output leads 618 and 620) to the parasitic systems. The threshold voltage may be set at, for example, 25 volts or 20 volts. A processor, such as central control unit 160, may monitor the secondary voltage output 604 and, in response to the voltage dropping below the threshold voltage, switch to battery cell 614 to provide the secondary voltage via leads 618 and 620.

Figure 7A:
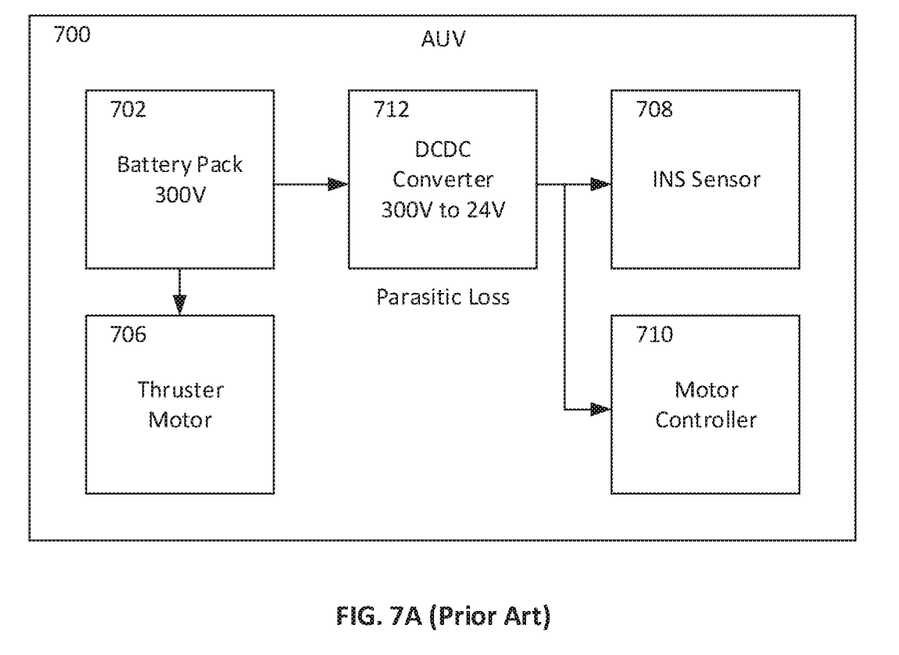
FIGS. 7A and 7B are block diagrams depicting exemplary remote vehicles, according to an illustrative aspect of the present disclosure.
Figure 7B:
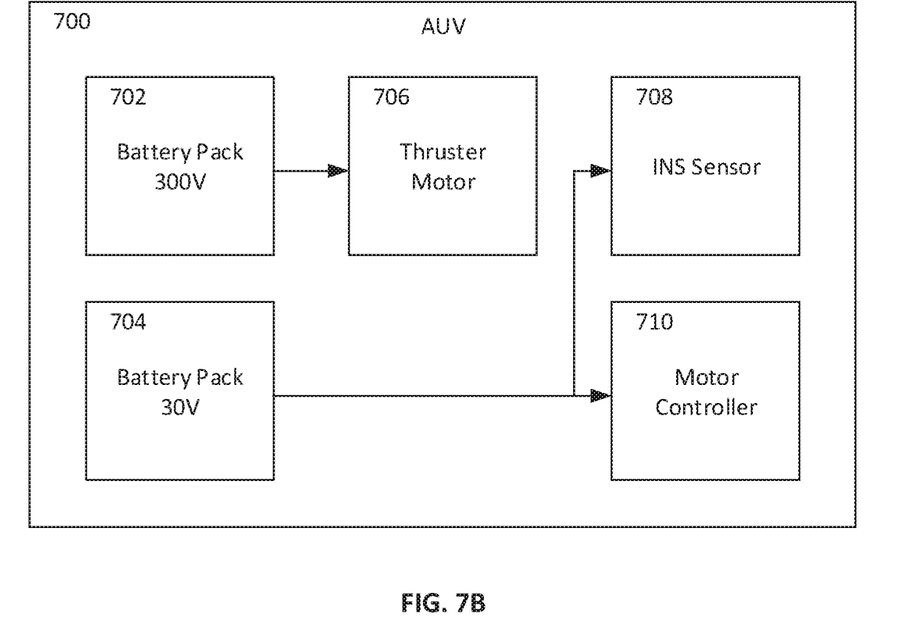

FIGS. 7A and 7B are block diagrams depicting exemplary AUVs 700, according to an illustrative aspect of the present disclosure. In one configuration, as shown in FIG. 7A, AUV 700 includes a 300V battery pack 702 that is used to deliver power to a thruster motor 706, inertial navigation system (INS) sensor 708, and motor controller 710. In this configuration, a DC-DC converter 712 converts the 300 V output from the battery pack 702 into a 24 V input for the INS sensor 708 and motor controller 710. The conversion from 300 V to 24 V using the DC-DC converter 712 results in parasitic loss. The configuration as shown in FIG. 7B reduces parasitic losses by eliminating the need for down conversion of voltages. In FIG. 7B, AUV 700 includes a 30 V battery pack 704 in addition to the 300 V battery pack 702 in separate enclosures. The 30 V battery pack 704 can be used to deliver power to the INS sensor 708 and motor controller 710.

Figure 8A:
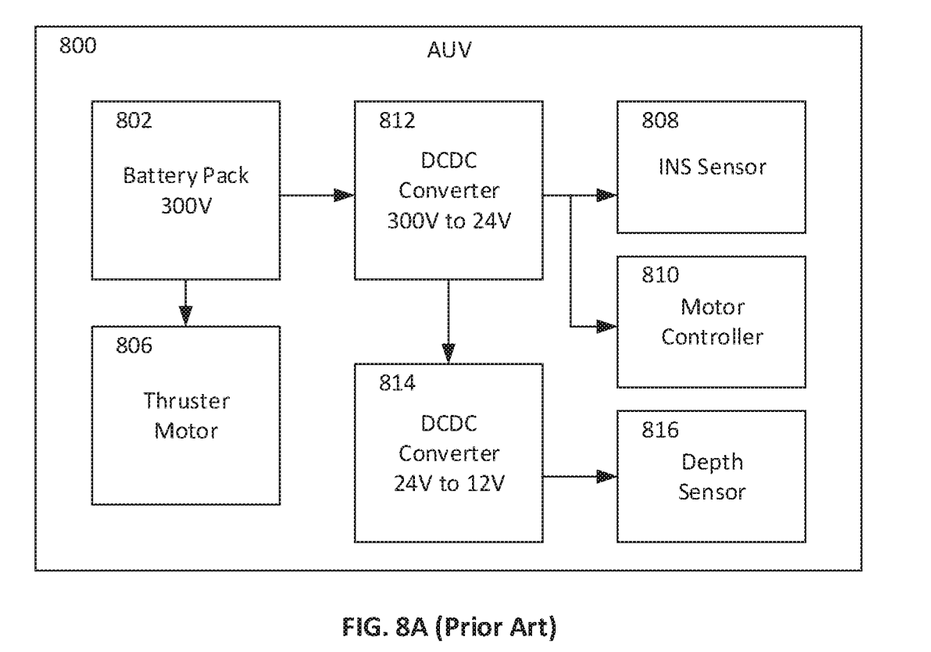
FIGS. 8A and 8B are block diagrams depicting exemplary remote vehicles, according to an illustrative aspect of the present disclosure.
Figure 8B:
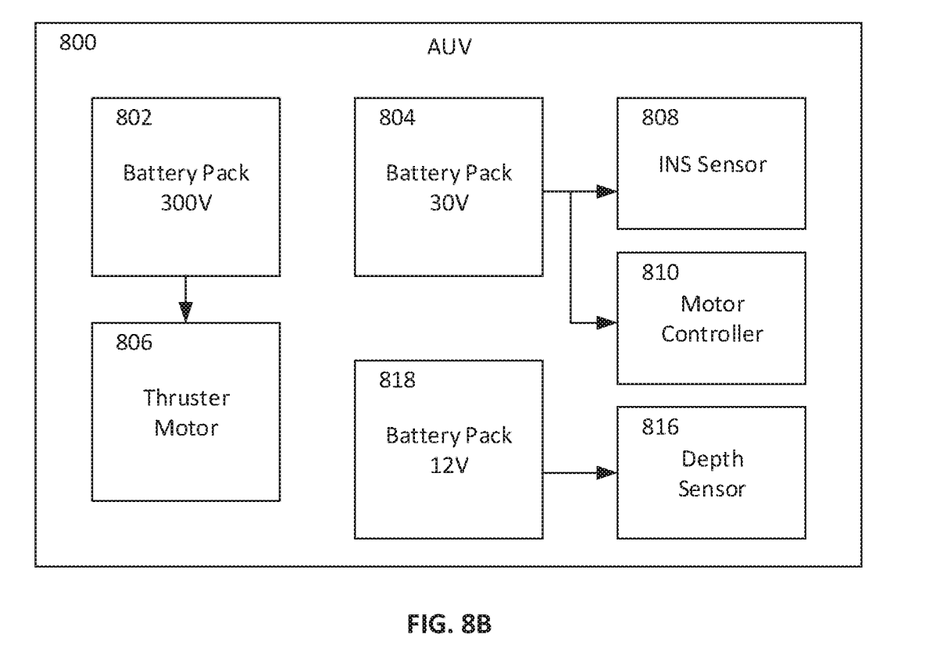
Figure 9:
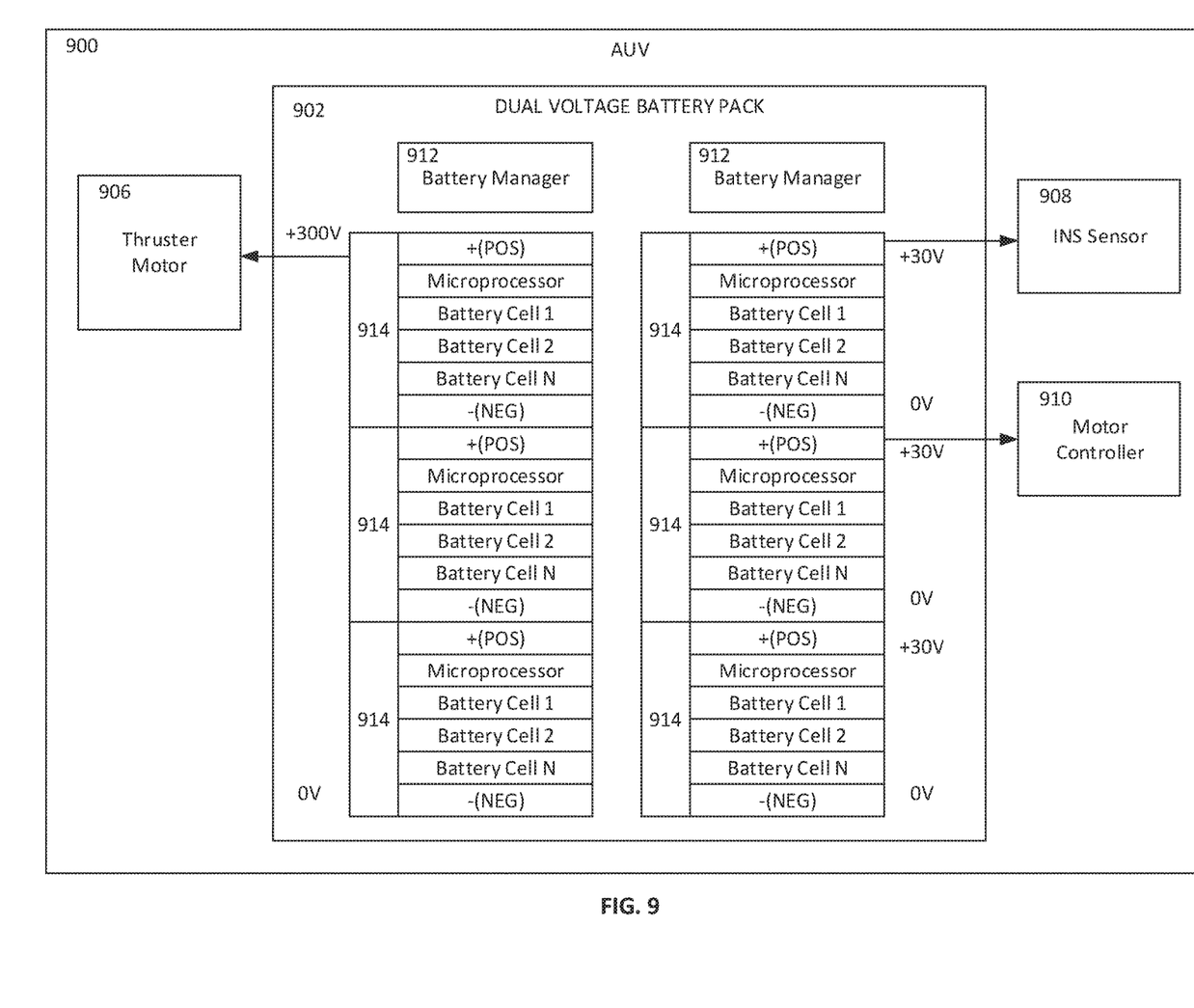
FIG. 9 is a block diagram depicting an exemplary remote vehicle, according to an illustrative aspect of the present disclosure.

FIGS. 8A and 8B are block diagrams depicting exemplary AUVs 800, according to an illustrative aspect of the present disclosure. Similar to AUV 700, as shown in FIGS. 7A and 7B, AUV 800 includes a 300V battery pack 802 that is used to deliver power to a thruster motor 806, INS sensor 808, motor controller 810, and depth sensor 816. In this configuration, a DC-DC converter 812 converts the 300 V output from the battery pack 802 into a 24 V input for the INS sensor 808 and motor controller 810. In one aspect, AUV 800 includes an additional DC-DC converter 814 that converts the 24 V output from the DC-DC converter 812 into a 12 V input for the depth sensor 816. The conversion from 300 V to 24 V and 24 V to 12 V using the DC-DC converters 812 and 814, respectively, results in parasitic losses. The configuration as shown in FIG. 8B reduces parasitic losses by eliminating the need for down conversion of voltages. In FIG. 8B, AUV 800 includes a 30 V battery pack 804 and a 12 V battery pack 818 in addition to the 300 V battery pack 802 in separate enclosures. The 30 V battery pack 804 can be used to deliver power to the INS sensor 708 and motor controller 710, and the 12 V battery pack 818 can be used to deliver power to the depth sensor 816.

FIG. 9 is a block diagram depicting an exemplary AUV 900, according to an illustrative aspect of the present disclosure. AUV 900 is similar to AUV 700 and AUV 800, except that the batteries are in the same enclosure. AUV 900 includes a dual voltage battery pack 902 that delivers power to thruster motor 906, INS sensor 908, and motor controller 910. Dual voltage battery pack 902 includes battery managers 912 and a number of batteries 914 that can be connected in series to deliver power at 300 V to the thruster motor 906 or arranged such that one of the batteries can deliver power to the INS sensor 908 at 30 V and another battery can deliver power to the motor controller 910 at 30 V. As discussed in relation to FIGS. 7B and 8B, this configuration reduces parasitic losses by eliminating the need for down conversion of voltages.

Figure 10A:
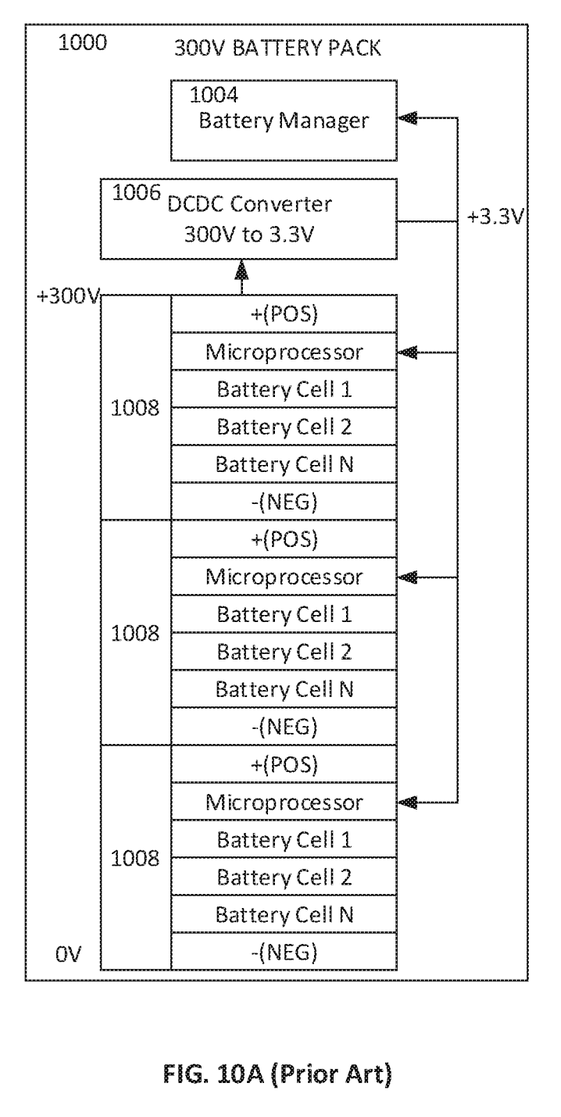
FIGS. 10A and 10B are block diagrams depicting battery modules including multiple battery cells, according to an illustrative aspect of the present disclosure.
Figure 10B:
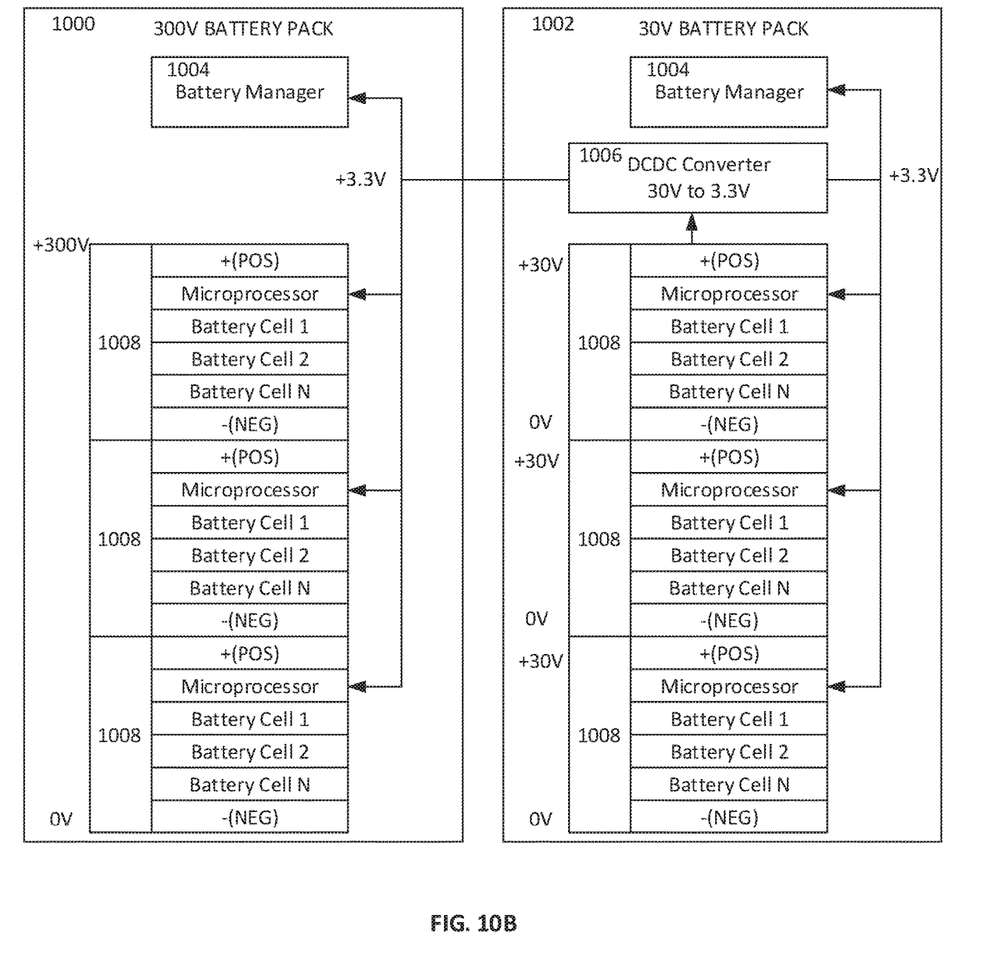

FIGS. 10A and 10B are block diagrams depicting battery pack including multiple battery, according to an illustrative aspect of the present disclosure. FIG. 10A shows a 300 V battery pack 1000 that includes a battery manager 1004, a DC-DC converter 1006, and batteries 1008. The batteries 1008 can be connected in series to deliver a power output at 300 V. Each battery 1008 includes multiple battery cells and a microprocessor that requires a 3.3 V power source. The DC-DC converter 1006 converts the 300 V output of the series-connected batteries 1008 into a 3.3 V input for powering the microprocessors of each battery 1008. The down conversion from 300 V to 3.3 V results in parasitic losses. These parasitic losses can be reduced by using the configuration as shown in FIG. 10B. FIG. 10B shows a 300 V battery pack 1000 and a 30 V battery pack 1002. The 30 V battery pack can be arranged such that each battery 1008 delivers a 30 V power output. The 30 V power output can be down converted to 3.3 V using the DC-DC converter 1006 such that the 3.3 V power output can be used to deliver power to the microprocessors of the batteries 1008 of the 300 V battery pack and the 30 V battery pack. By reducing the voltage down conversion by an order of magnitude, the parasitic power losses are reduced.

While the foregoing describes implementations in relation to autonomous underwater vehicles, one of ordinary skill recognizes the foregoing disclosures can be applied to any battery operated systems that operate in land, air, water, or space. For example, the aspects describes herein may apply to: land vehicles and/or robotic systems operating in manufacturing or other facilities; lunar vehicles on the surface of the moon, aerial drones used to delivery of materials or products to consumers, and any vehicles utilizing a battery power source while having relatively disparate high and low voltage systems and/or loads.

It will be apparent to those skilled in the art that such aspects are provided by way of example only. It should be understood that numerous variations, alternatives, changes, and substitutions may be employed by those skilled in the art in practicing the invention. Accordingly, it will be understood that the invention is not to be limited to the aspects disclosed herein, but is to be understood from the following claims, which are to be interpreted as broadly as allowed under the law.

What is claimed is:

1. A power system for an autonomous vehicle comprising:
a first battery pack arranged to: i) operate at a first voltage and deliver first power to one or more primary systems, and ii) receive a third voltage from a voltage down converter, wherein the first battery pack includes a plurality of batteries, each battery includes a processor; and
a second battery pack including the voltage down converter arranged to: i) operate at a second voltage and deliver second power to a first one or more parasitic systems, and ii) deliver the third voltage from the voltage down converter to the first battery pack, wherein the third voltage is delivered to the processor of each of the plurality of batteries; and wherein the second voltage is lower than the first voltage.

2. The power system of claim 1, wherein the second voltage is lower than the first voltage by a factor of one of 2, 3, 4, 5, 10, 15, 20, and 100.

3. The power system of claim 1, wherein the first voltage is greater than or equal to one of 600 V, 500 V, 400 V, 300 V, 200 V, 100 V, 75 V, and 50 V.

4. The power system of claim 1, wherein the second voltage is less than or equal to one of 1 V, 2 V, 3 V, 4 V, 5 V, 10 V, 20 V, 30 V, 50 V, and 100 V.

5. The power system of claim 1, wherein the first battery pack comprises a first plurality of batteries.

6. The power system of claim 1, wherein the second battery pack comprises a second plurality of batteries.

7. The power system of claim 1, further comprising management circuitry configured to manage the first power delivered from the first battery pack and the second power delivered from the second battery pack.

8. The power system of claim 7, wherein the management circuitry comprises a first sub management circuitry in order to manage the first power delivered from the first battery pack and a second sub management circuitry to manage the second power delivered from the second battery pack.

9. A method for providing power to an autonomous vehicle comprising:
operating a first battery pack at a first voltage;
delivering first power to a first one or more primary systems from the first battery pack, wherein the first battery pack includes a plurality of batteries, each battery including a processor;
operating a second battery pack at a second voltage, wherein the second voltage is lower than the first voltage;
operating, by the second battery pack, a voltage down converter;
delivering, from the voltage down converter, a third voltage to the first battery pack, comprising delivering the third voltage to the processor of each of the plurality of batteries; and
delivering second power to a second one or more primary systems from the second battery pack.

10. The system of claim 1, wherein the third voltage is less than the first voltage and the second voltage.

11. The system of claim 1, wherein the voltage down converter includes a DC-DC converter.

12. The method of claim 9, wherein the third voltage is less than the first voltage and the second voltage.

13. The method of claim 9, wherein the voltage down converter includes a DC-DC converter.

\* \* \* \* \*